May 6, 1941.  J. GIFT  2,241,197

FLUID CONTROL SYSTEM

Filed Jan. 20, 1940

INVENTOR
John Gift
BY
Pennie Davis Marvin Edmonds
ATTORNEYS

Patented May 6, 1941

2,241,197

UNITED STATES PATENT OFFICE 2,241,197

FLUID CONTROL SYSTEM

John Gift, Temple, Pa., assignor to Rosedale Knitting Company, Reading, Pa., a corporation of Pennsylvania Application January 20, 1940, Serial No. 314,809

1 Claim. (Cl. 137—68)

This invention relates to the method of adjusting the level of liquid maintained in a float chamber. The method of the invention may be used in connection with apparatus employed for various purposes, one of which is the conditioning of thread to render it pliable and prepare it for use in textile manufacture. It has been found to have special advantages in systems for the conditioning of thread to be knitted into full-fashioned hosiery.

The amount of liquid which should be taken up by the thread in the conditioning operation depends on various factors, such as atmospheric conditions and the kind of material of which the thread is made, but the amount remains constant for a given thread so long as atmospheric conditions remain the same. When a change in conditions occurs or a different thread is put into use, it may be necessary to permit the thread to take up a different quantity of liquid, and this can be accomplished by changing the position of the guides determining the path of the thread through the liquid or by altering the liquid level of the vessel. As changing the guides is laborious and time consuming, altering the liquid level is to be preferred.

The present invention is, accordingly, directed to the provision of a novel method for adjusting the level of liquid in a float chamber which is particularly adapted for use in connection with a thread conditioning system which includes one or more vessels for conditioning liquid and means by which the liquid is supplied thereto automatically and maintained therein at a predetermined level which may be varied as desired. The system includes a source of conditioning liquid under pressure and a main supply line leading therefrom and connected by branches to the vessels. In the line is an adjustable pressure-reducing means and beyond is a float-controlled valve means. Adjustment of the pressure-reducing means produces variations in the pressure of the liquid entering the valve means, and the height of the level of the liquid in the valve means which operates the float to close the valve is correspondingly varied. The vessels are so connected to the valve means that the height of the liquid therein is the same as that of the body of liquid acting on the float, and, consequently, by adjustment of the pressure-reducing means, the level of the liquid in the vessels may be raised or lowered, as may be desired. Once the level is established, it is maintained constant by the action of the valve means.

For a better understanding of the invention, reference may be had to the accompanying drawing in which.

Figure 1:
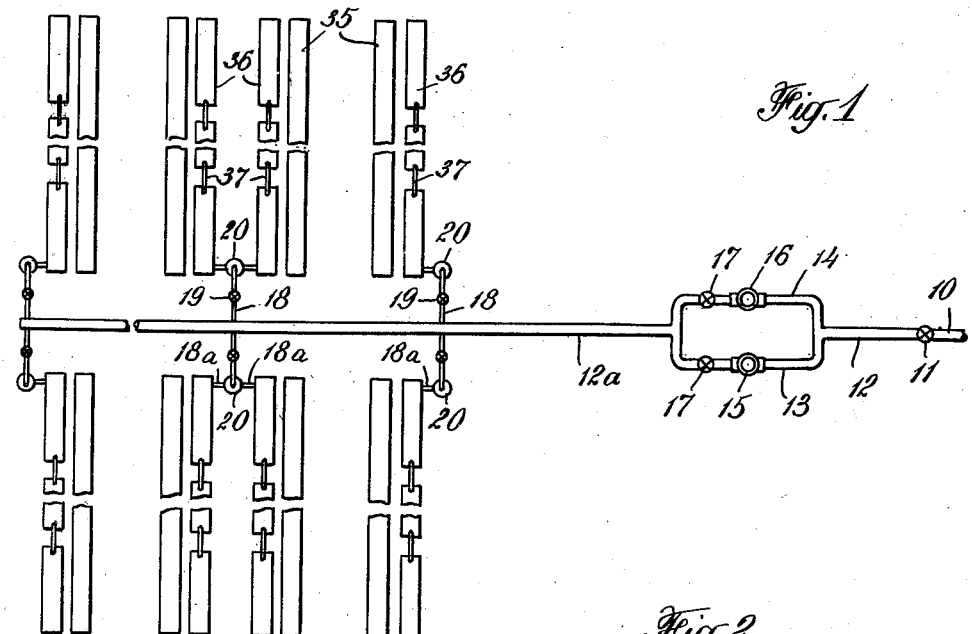
Fig. 1 is a diagrammatic plan view of a conditioning system in which the method of the present invention may be used.
Figure 2:
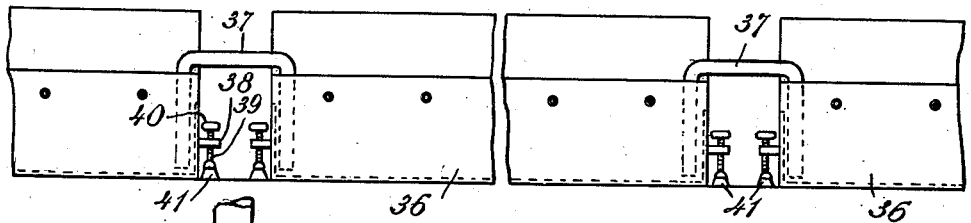
Fig. 2 is a view in side elevation of the liquid vessels employed in the system.

The system illustrated in Fig. 1 is intended to supply conditioning liquid to the pans of a plurality of knitting machines which are illustrated as lying side by side in two rows. The machines in each row are arranged in pairs with the machines of a pair facing one another, and the pans are mounted at the rear of the machines.

The conditioning liquid, which may be water, is supplied under pressure from an overhead tank or a city main, and the line 10 indicates such a source of liquid under pressure. In the line is a shut-off valve 11 from which leads a line 12, a portion of which is subdivided into parallel branches 13, 14 leading to a continuation 12a of the line. In each branch is a pressure-reducing valve 15, 16, and these valves are set to produce different reductions in the pressure of the liquid passing therethrough. In each branch is a shut-off valve 17, and when the system is in operation, one of the branches is closed by its shut-off valve so that only one pressure-reducing valve is in action. If desired, the branches with their pressure-reducing and shut-off valves may be replaced by a single pressure-reducing valve of the adjustable type, but ordinarily the provision of means by which two different pressure reductions can be obtained is satisfactory. Accordingly, the branches with their separate reducing valves are employed, since a change in liquid level may then be obtained merely by the opening and closing of shut-off valves and without necessity of making a careful adjustment of a reducing valve.

Figure 3:
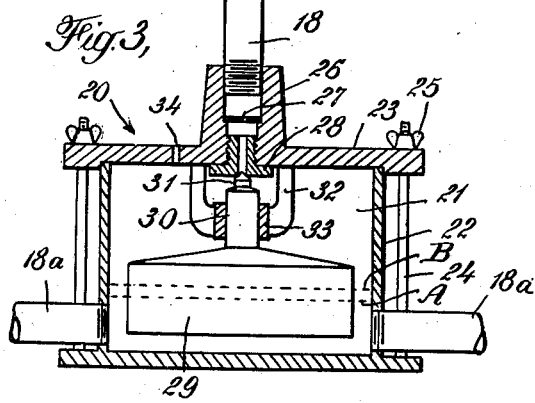
Fig. 3 is a vertical sectional view through a flow control device used in the system.

Beyond the pressure-reducing means, branches 18 lead from the line 12a and in each branch is a shut-off valve 19 beyond which the branch leads to a metering unit 20. The metering unit is illustrated in Fig. 3 and it includes a chamber 21 formed of a casing 22 having a removable top 23 held in place by rods 24 secured to the base of the casing and passing through openings in the peripheral flange of the top, the rods having wing nuts 25 threaded thereon by which the top can be held tightly against the upper edge of the casing. The top is provided with a hollow central boss 26 in which the end of the branch 18 is threaded and in the passage through the boss a screen 27 may be mounted, if desired. A bushing 28 having a bore therethrough is threaded into the lower end of the passage through the boss and the lower end of the bore is reamed to provide a valve seat. Within the chamber 21 is a float 29 having an extension 30 from its upper end which terminates in a stem 31 having a conical end adapted to cooperate with the valve seat to form a float-controlled valve. The extension 30 is guided in its vertical movements as the float rises and falls in any suitable way as, for example, by means of a spider 32 attached to the inner surface of the top 23 and having a sleeve 33 through which the extension passes with a fairly close fit. The top has a vent opening 34 and from the side wall of the chamber near the lower end thereof lead one or more continuations 18a of the branch 18.

In the system shown in Fig. 1, the knitting machines are indicated diagrammatically at 35 and the machines are shown arranged in pairs, with the members of a pair facing one another. Extending along the back of each machine is a row of vessels 36, and one such vessel may be provided for each two sections of the machine. The vessels may take the form of open top sheet metal pans and a branch line 18a leads into the end pan of the series on a machine, adjacent pans being then connected by syphon tubes 37 which extend down into the pans to points near the bottom thereof. In order to insure that the pans are level, they may be provided, if desired, with brackets 38 mounted on their end walls, a screw 39 having a wing nut 40 at its top and bearing against a foot 41 being threaded through each bracket to make possible the raising or lowering of the end of the pan to which the bracket is attached.

The pans used for the purpose are provided with guides which direct the thread beneath the level of the liquid therein and means for removing the excess liquid from the thread. For this purpose, various expedients may be employed, but I prefer to use the pans illustrated and described in my co-pending application Serial No. 314,385, filed January 18, 1940.

In the system shown in Fig. 1, a metering unit 20 is used to control the supply of liquid to the pans of a pair of machines wherever that is convenient, and the pans of the end machines in the rows have metering units through which they alone are supplied.

In the operation of the system, the valve 11 is opened and the conditioning liquid from the source passes through one or the other of pressure-reducing valves 15, 16 and then flows through line 12a at a selected reduced pressure and through branches 18 to the metering units 20. The liquid entering each unit flows out into the pans and as the level of the liquid in the chamber of each unit and the pans supplied thereby rises, the float 29 in the unit likewise rises. Ultimately the level of the liquid in the chamber and pans rises until the float closes the inlet valve into the chamber of the unit. The level at which the closing of the valve occurs depends on the pressure in the main supply line 12a and the branch 18. Thus, with the liquid supplied to a metering unit under twenty pounds pressure, the float must have a definite buoyancy to force the valve closed against the pressure of the liquid and a certain portion of the float must be submerged in order that the float may have such buoyancy. If the pressure of the liquid supply is increased, for example, to thirty pounds, the float must have a greater buoyancy to force the control valve shut and this increased buoyancy is obtained by a rise in the liquid level in the chamber and a consequent greater submergence of the float therein. Accordingly, by varying the pressure of the liquid in the supply line, variations in the liquid level within the chamber of each metering unit and the pans supplied therefrom can be obtained.

Such variations in the liquid level in the pans vary the length of the path of travel of the thread through the liquid in each pan and also the conditioning action to which the thread is subjected. Thus, when the level of the liquid in the metering unit chamber and pans is as indicated at A, the path of travel through the liquid of the threads is shorter than when the liquid level in the chamber and pans is as indicated at B. With the latter level, the threads will accordingly take up more liquid than with the former level.

As the liquid in the pans is used up and the level falls, the level of the liquid in the metering unit supplying those pans likewise falls until the lowering of the float opens the supply valve and more liquid enters the metering unit. Liquid then enters the chamber and flows into the pans until the float is again raised and the valve closed. The level in the pans is thus automatically maintained at a substantially uniform height, which depends on the pressure in the supply line.

If, after a period in which the pans have contained liquid at a high level, conditions require that a lower level be employed, the readjustment in the pressure-reducing means is made and thereafter the float-controlled valve in each metering unit will remain closed until enough liquid in each pan has been used up to reduce the level to the lower height desired. Thereafter, the metering units will maintain the liquid at the new level in the pans until a further adjustment in the pressure is made.

I claim:

The method of adjusting the level of liquid maintained in a float chamber by a float-operated valve subject to be moved toward open position by pressure of the incoming liquid and to be closed by the buoyancy of the float which comprises maintaining the pressure of the incoming liquid at a predetermined pressure, whereby the buoyant force of the float necessary to shut off the supply of liquid, and the resultant level thereof in the float chamber, will vary as the predetermined pressure of the incoming liquid is varied.

JOHN GIFT.